United States Patent
Sohmshetty et al.

(10) Patent No.: US 12,499,665 B2
(45) Date of Patent: Dec. 16, 2025

(54) METHOD AND SYSTEM TO AUGMENT IMAGES AND LABELS TO BE COMPATIBLE WITH VARIOUS MACHINE LEARNING MODELS

(71) Applicant: Ford Global Technologies, LLC, Dearborn, MI (US)

(72) Inventors: Raj Sohmshetty, Canton, MI (US); Vikas Rajendra, Novi, MI (US); Surya Gandikota, Richmond, TX (US); Tanveer Shaik, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 18/179,613

(22) Filed: Mar. 7, 2023

(65) Prior Publication Data
US 2024/0303975 A1 Sep. 12, 2024

(51) Int. Cl.
*G06V 10/774* (2022.01)
*G06F 18/214* (2023.01)
(Continued)

(52) U.S. Cl.
CPC ........ *G06V 10/7753* (2022.01); *G06F 18/214* (2023.01); *G06N 3/08* (2013.01);
(Continued)

(58) Field of Classification Search
CPC .... G06V 10/7753; G06V 10/46; G06V 20/70; G06V 10/25; G06V 10/44; G06V 10/82;
(Continued)

(56) References Cited

U.S. PATENT DOCUMENTS

| 10,235,601 B1 | 3/2019 | Wrenninge et al. |
| 10,546,217 B2 | 1/2020 | Albright et al. |

(Continued)

FOREIGN PATENT DOCUMENTS

| WO | WO-2022272014 A1 * | 12/2022 |
| WO | WO-2024020085 A1 * | 1/2024 |

OTHER PUBLICATIONS

Lang et al., DAFNe: A One-Stage Anchor-Free Deep Model for Oriented Object Detection, Sep. 22, 2021 [retrieved Apr. 24, 2025], Cornell University: arXiv, version [v2], 14 pages. https://doi.org/10.48550/arXiv.2109.06148 (Year: 2021).*

(Continued)

*Primary Examiner* — Henok Shiferaw
*Assistant Examiner* — Dennis Rosario
(74) *Attorney, Agent, or Firm* — Burris Law, PLLC

(57) ABSTRACT

A method includes obtaining an authentic image of an assembly and a boundary label provided with the authentic image. The boundary label is associated with a selected region of the authentic image depicting a selected object. The method includes generating an augmented image based on the authentic image and an augmentation model employing one or more augmentation parameters, defining a model boundary label on a blank image at a region that correlates with the selected region of the authentic image, generating an augmented blank image based on the one or more augmentation parameters employed for the augmented image, identifying, as an augmented boundary label associated with augmented image, the model boundary label in the augmented blank image, and outputting an augmented image data, wherein the augmented image data incudes data indicative of the augmented image and of the augmented boundary label.

20 Claims, 3 Drawing Sheets

(51) Int. Cl.

| | |
|---|---|
| *G06N 3/08* | (2023.01) |
| *G06N 3/0895* | (2023.01) |
| *G06N 3/09* | (2023.01) |
| *G06N 5/04* | (2023.01) |
| *G06N 20/00* | (2019.01) |
| *G06T 5/60* | (2024.01) |
| *G06T 7/00* | (2017.01) |
| *G06V 10/25* | (2022.01) |
| *G06V 10/46* | (2022.01) |
| *G06V 10/70* | (2022.01) |
| *G06V 10/82* | (2022.01) |
| *G06V 20/40* | (2022.01) |
| *G06V 20/70* | (2022.01) |
| *G06V 30/19* | (2022.01) |
| *G06V 30/414* | (2022.01) |

(52) U.S. Cl.
CPC ............. *G06N 3/0895* (2023.01); *G06N 3/09* (2023.01); *G06N 5/04* (2013.01); *G06N 20/00* (2019.01); *G06T 5/60* (2024.01); *G06T 7/0002* (2013.01); *G06T 7/0004* (2013.01); *G06T 7/0006* (2013.01); *G06V 10/25* (2022.01); *G06V 10/46* (2022.01); *G06V 10/70* (2022.01); *G06V 10/774* (2022.01); *G06V 10/82* (2022.01); *G06V 20/41* (2022.01); *G06V 20/70* (2022.01); *G06V 30/19147* (2022.01); *G06V 30/414* (2022.01); *G06T 2207/20081* (2013.01); *G06T 2207/20084* (2013.01); *G06T 2207/30164* (2013.01); *G06T 2210/12* (2013.01); *G06T 2211/441* (2023.08); *G06T 2219/004* (2013.01)

(58) Field of Classification Search
CPC .... G06V 10/774; G06V 20/20; G06V 30/413; G06V 20/41; G06V 20/56; G06V 20/698; G06V 20/35; G06V 20/36; G06V 20/38; G06V 30/19173; G06V 10/242; G06V 10/243; G06V 10/7515; G06V 10/809; G06V 30/18057; G06V 10/70; G06V 40/172; G06V 2201/06; G06V 30/1463; G06V 30/1475; G06V 30/414; G06V 20/58; G06V 30/19147; G06N 20/00; G06N 3/08; G06N 3/0475; G06N 3/094; G06N 3/09; G06N 3/0895; G06N 5/04; G06T 2207/20084; G06T 2207/20081; G06T 2210/12; G06T 3/60; G06T 2207/30252; G06T 2207/20021; G06T 2219/004; G06T 2219/2016; G06T 3/40; G06T 5/60; G06T 7/30; G06T 2207/30148; G06T 2207/30168; G06T 2207/30141; G06T 3/4046; G06T 2207/30108; G06T 2207/30116; G06T 2207/30121; G06T 2207/30152; G06T 2207/30156; G06T 2207/30164; G06T 2207/30212; G06T 2207/30236; G06T 2207/30248; G06T 2207/30268; G06T 2210/22; G06T 2219/2008; G06T 2219/2004; G06T 7/0004; G06T 7/10; G06T 7/12; G06T 7/13; G06T 7/149; G06T 7/181; G06T 2210/61; G06T 7/0002; G06T 7/0006; G06T 7/0008; G06T 7/001; G06T 2207/30264; G06T 2207/30261; G06T 2207/30256; G06T 2211/441; G06F 18/214; G06F 18/2431; G06F 18/24; G06F 18/241; G06F 3/04845; G06F 18/23; G06F 18/24323; G06F 16/906; G06F 18/254; G06F 16/285; G06F 2218/12; G06F 16/55; G06F 16/75; G06F 18/2155; G06F 18/2178; G06F 18/2185

See application file for complete search history.

(56) References Cited

U.S. PATENT DOCUMENTS

| | | |
|---|---|---|
| 11,273,553 B2 | 3/2022 | Li et al. |
| 2019/0050427 A1* | 2/2019 | Wiesel .................. G06T 19/00 |
| 2021/0004017 A1* | 1/2021 | Colgate ................ G01C 21/30 |
| 2024/0386637 A1* | 11/2024 | Metzner ............... G06T 7/0006 |

OTHER PUBLICATIONS

Lang et al., DAFNe: A One-Stage Anchor-Free Approach for Oriented Object Detection, May 30, 2022 [retrieved Apr. 24, 2025], Cornell University: arXiv, version [v4], 17 pages. https://doi.org/10.48550/arXiv.2109.06148 (Year: 2022).*

* cited by examiner

METHOD AND SYSTEM TO AUGMENT IMAGES AND LABELS TO BE COMPATIBLE WITH VARIOUS MACHINE LEARNING MODELS

FIELD

The present disclosure relates to a method and system for augmenting images for machine learning models.

BACKGROUND

The statements in this section merely provide background information related to the present disclosure and may not constitute prior art.

Generally, a machine learning model can require a significant amount of image data when training an object detection model. Images used for the training undergo a preprocessing step, such as labeling. Specifically, one or more sections of the image that is of interest is labeled and the image is augmented to create multiple other images, which are used for training the object detection model. For example, during augmentation, the original image can be rotated, contrasted, brightened, dimmed, vertically flipped, horizontally flipped, and/or blurred to generate additional images. However, the labels may not be augmented, and thus, additional processes (e.g., manual process) may be needed to provide an accurate label with the augmented images. These and other issues related to generating augmented images are addressed by the present disclosure.

SUMMARY

This section provides a general summary of the disclosure and is not a comprehensive disclosure of its full scope or all of its features.

In one form, the present disclosure is directed to a method including obtaining an authentic image of an assembly and a boundary label provided with the authentic image, where the boundary label is associated with a selected region of the authentic image depicting a selected object; generating an augmented image based on the authentic image and an augmentation model employing one or more augmentation parameters; defining a model boundary label on a blank image at a region that correlates with the selected region of the authentic image; generating an augmented blank image based on the one or more augmentation parameters employed for the augmented image; identifying, as an augmented boundary label associated with augmented image, the model boundary label in the augmented blank image; and outputting an augmented image data, wherein the augmented image data incudes data indicative of the augmented image and of the augmented boundary label.

The following paragraph includes variations of the method of the above paragraph, and the variations may be implemented individually or in any combination while remaining within the scope of the present disclosure.

In some variations, the method further includes defining a locked boundary label based on positional data of the model boundary label, where the locked boundary label is outputted as the augmented boundary label, and dimensions of the locked boundary label is defined to be unrestricted to dimensions of the boundary label of the authentic image. In some variations, the locked boundary label is defined by a first boundary axis and a second boundary axis orthogonal to the first boundary axis, the first boundary axis and the second boundary axis are parallel to a first model axis and a second model axis, respectively, and the first model axis and second model axis are orthogonal to each other and define a two-dimensional coordinate plane of the blank image. In some variations, defining the locked boundary label further includes setting coordinates of the locked boundary label based on a maximum coordinate value and a minimum coordinate value of the model boundary label along each of the first model axis and the second model axis. In some variations, the method further includes determining whether a locked boundary label is desired, wherein, the defining the locked boundary label is provided in response to determining the locked boundary label is desired. In some variations, the augmented blank image is defined by a plurality of pixels having a black pixel value. In some variations, dimensions of the model boundary label is restricted to dimensions of the boundary label associated with the authentic image. In some variations, an orientation of the model boundary label is unrestricted to an orientation of the boundary label associated with the authentic image. In some variations, the identifying, as the augmented boundary label associated with the augmented image, the model boundary label in the augmented blank image using a contour identification software application. In some variations, the augmentation parameters includes a rotation parameter, a vertical translation parameter, a horizontal translation parameter, or a combination thereof.

In one form, the present disclosure is directed to a method that includes obtaining an authentic image of an assembly and a boundary label provided with the authentic image, where the boundary label is associated with a selected region of the authentic image depicting a selected object; generating an augmented image based on the authentic image and an augmentation model employing one or more augmentation parameters; determining whether the one or more augmentation parameters includes an orientation modification parameter; outputting, in response to the one or more augmentation parameter including the orientation modification parameter, a first augmented image data, where the first augmented image data includes data indicative of the augmented image and of the boundary label; and performing a boundary label augmentation routine, in response to the one or more augmentation parameter including the orientation modification parameter. The boundary label augmentation routine includes defining a model boundary label on a blank image at a region that correlates with the selected region of the authentic image; generating an augmented blank image based on the one or more augmentation parameters employed for the augmented image; identifying, as an augmented boundary label associated with augmented image, the model boundary label in the augmented blank image; and outputting a second augmented image data, wherein the second augmented image data includes data indicative of the augmented image and of the augmented boundary label.

The following paragraph includes variations of the method of the above paragraph, and the variations may be implemented individually or in any combination while remaining within the scope of the present disclosure.

In some variations, the augmentation parameters further includes a contrast parameter, a brightness parameter, a sharpness parameter, or a combination thereof. In some variations, the boundary label augmentation routine further includes: defining a locked boundary label based on positional data of the model boundary label, where the locked boundary label is outputted as the augmented boundary label, and dimensions of the locked boundary label is defined to be unrestricted to dimensions of the boundary label of the authentic image. In some variations, the locked boundary label is defined by a first boundary axis and a second boundary orthogonal to the first boundary axis, the first boundary axis and the second boundary axis are parallel to a first model axis and a second model axis, respectively, and the first model axis and second model axis are orthogonal to each other and define a two-dimensional coordinate plane of the blank image. In some variations, defining the locked boundary label further includes setting coordinates of the locked boundary label based on a maximum coordinate value and a minimum coordinate value of the model boundary label along each of the first model axis and the second model axis. the boundary label augmentation routine further comprises determining whether a locked boundary label is desired, wherein, the defining the locked boundary label is provided in response to determining the locked boundary label is desired. In some variations, the orientation modification parameter includes a rotation parameter, a vertical translation parameter, a horizontal translation parameter, or a combination thereof. In some variations dimensions of the model boundary label is restricted to dimensions of the boundary label associated with the authentic image. In some variations, an orientation of the model boundary label is unrestricted to an orientation of the boundary label associated with the authentic image. In some variations, the identifying, as the augmented boundary label associated with the augmented image, the model boundary label in the augmented blank image using a contour identification software application.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
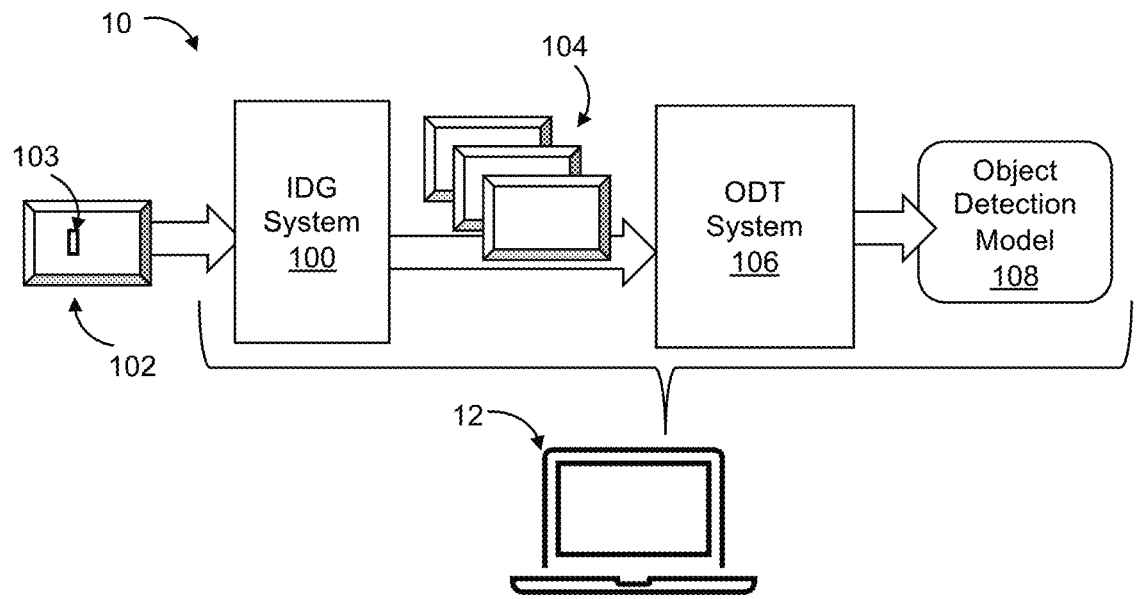
FIG. 1 is an illustrative diagram of an image dataset generation (IDG) system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a system and/or method to augment images and boundary labels to be used for, in one example, training a machine learning model. One advantage of the present disclosure includes augmenting both the authentic image and the boundary labels such that the boundary labels are augmented along an x/y axis. In doing so, this method generates multiple augmented images (i.e., modified and/or transformed images) along with the augmented boundary labels that may be used by various machine learning programs to train various machine learning models.

Referring to FIG. 1, a system is provided in accordance with the teachings of the present disclosure is generally indicated by reference numeral 10. In one form, the system 10 may be provided using one or more computing devices 12, such as, but not limited to: a laptop; tablet; desktop; a server accessible via a web-based or software application provided on another computing device like a laptop. In one form, the system 10 includes an image dataset generation (IDG) system 100 and, optionally, an object detection training (ODT). In one form, the IDG system 100 obtains an authentic image 102 of an assembly/component, where the authentic image 102 may be a multi-dimensional image (e.g., a two-dimensional image). In addition to the authentic image 102, the IDG system 100 may receive data related to a boundary label 103 defined on the authentic image, where the boundary label 103 is associated with a selected region of the authentic image depicting a selected object. The IDG system 100 generates augmented image data 104 based on the authentic image, the boundary label, and one or more augmentation parameters. The augmented image data includes data indicative of one or more augmented images and of, if applicable, one or more augmented boundary label identifying the selected region depicting the selected object as it relates to the augmented image(s). The ODT system 106 trains and generates an object detection model 108 for detecting the selected object based on the augmented image data 104, which may be used in various applications, such as, but not limited to: detecting defects in a component/assembly and/or identifying objects in an assembly process.

In one form, while the boundary label 103 is illustrated and described herein as having a rectangular shape, the boundary label 103 may have other suitable shape, and may include a bounding box, a bounding polygon, a pixel-perfect annotation, or other suitable shape or annotation that includes label metadata such as the object class and/or other object metadata.

Figure 2:
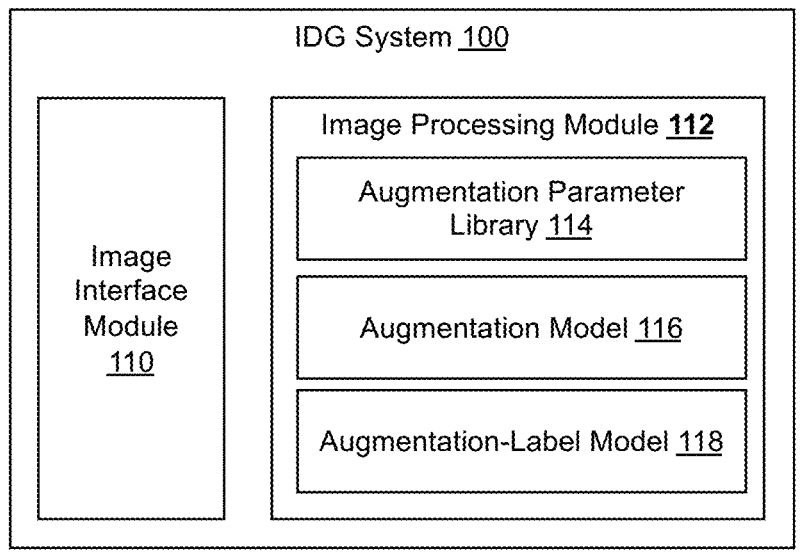
FIG. 2 is a block diagram of the IDG system of FIG. 1, according to the present disclosure.

Referring to FIG. 2, an example of the IDG system 100 for augmenting an authentic image 102 having a boundary label 103 is provided. In one form, the IDG system 100 includes an image interface module 110 and an image processing module 112. In one form, the image interface module 110 is configured to exchange data with external devices (e.g., a laptop operated by a user) and present graphical interfaces via a display to communicate with the user. The image interface module 110 is configured to obtain the authentic image data, which is indicative of the authentic image 102 and the boundary label 103. The authentic image data may be obtained in various suitable ways, such as, but not limited to, a digital camera and/or a storage device (e.g., memory stick, cloud-based server, memory on the computing device) storing the authentic image data.

In addition to receiving the authentic image data, the image interface module 110 is configured to obtain inputs related to augmentation parameters used for generating the augmented image data. More particularly, features of the authentic image is altered using one or more augmentation parameters selected from among a plurality of defined augmentation parameters. In an example application, the user selects the augmentation parameters via a computing device in communication with the IDG system 100. In one form, the defined augmentation parameters include orientation modification parameters, image adjustment parameters, and any other parameter that effects the visual qualities of an image. In one form, the orientation modification parameters include a rotation parameter, a vertical translation parameter, a horizontal translation parameter, a scaling parameter, a flipping/inverting parameter, or a combination thereof. In one form, the image adjustment parameters include a level parameter, a sharpness parameter, a contrast parameter, a brightness parameter, a dynamic range parameter, a balance parameter, a saturation parameter, a color level parameter, or a combination thereof. In addition, some of the defined augmentation parameters may include upper and lower limits, a target/specific value, a weighted value in relation to the authentic image and/or a ratio value.

In one form, the image processing module 112 is configured to generate the augmentation image data including data indicative of the augmented image and of the augmented boundary label based on the authentic image data and the selected augmentation parameters. In one form, the image processing module 112 is configured to include an augmentation parameter library 114 that stores instructions for carrying the plurality of defined augmentation parameters, an augmentation model 116, and an augmentation-label model 118. The augmentation model 116 is configured to generate one or more augmented images based on the authentic image and the selected augmentation parameters. That is, using instructions in the augmentation parameter library 114, the augmentation model 116 applies various combinations of the selected augmentation parameters to the authentic image to generate one or more augmented images. For example, if three augmentation parameters are selected, the augmentation model 116 may randomly apply the selected augmentation parameters, separately or in combination, to generate multiple augmented images. In lieu of randomly applying the selected augmentation parameters, the user may define which combination of the selected augmentation parameters should be used. In lieu of generating any number of augmented images, the user may define the number of augmented images to generate. These additional instructions defining combinations of augmentation parameters and/or number of augmented images can be provided via the image interface module 110.

In one form, the image processing module 112 is configured to determine whether to augment the boundary label based on a user input. If the user does not elect to augment the boundary labels along with the authentic image 102, the image processing module 112 only augments the authentic image 102 as provided above.

The augmentation-label model 118 is configured to augment the boundary label based on the selected augmentation parameters. More particularly, for a selected augmented image generated using one or more of the selected augmentation parameters, the augmentation-label model 118 defines an augmented boundary label based on at least some of the selected augmentation parameters. As described herein, the augmentation-label model 118 is configured to provide an unlocked boundary label (i.e., a model boundary label) or a locked boundary label. In one form, an unlocked boundary label is restricted to dimensions of the boundary label associated with the authentic image. More specifically, an unlocked boundary label is of substantially similar shape and/or size as the boundary label of the authentic image. A locked boundary label may vary in size and/or shape of the boundary label and has its axes substantially parallel to an x-axis and to a y-axis, where the x-axis is orthogonal to the y-axis. Stated differently, the locked boundary label is defined by a first boundary axis and a second boundary axis orthogonal to the first boundary axis. The first boundary axis and the second boundary axis are configured to be parallel to a first model label axis and a second model label axis, respectively, where the first model axis and the second model axis are orthogonal to each other and define a two-dimensional coordinate plane of the blank image. As described herein, in one form, the locked boundary label is defined based on a maximum coordinate value and a minimum coordinate value of the model boundary label along each of the first model axis and the second model axis.

To generate the augmented label, in one form, the augmentation-label model 118, which may also be provided as a boundary label augmentation routine, is configured to define a model boundary label on a blank image at a region that correlates with the selected region of the authentic image. The blank image is defined by a plurality of pixels having a black pixel value. Using the authentic image 102, the augmentation-label model 118 is configured to locate the boundary labels and draw a model boundary label onto the blank image. The model boundary label is a new boundary label that is provided on the blank image. In an example application, the model boundary label is provided in white pixel values. In one form, the image processing module 112 is configured to generate an augmented blank image having the model boundary label based on at least some of the one or more selected augmentation parameters employed for the augmented image. More specifically, the augmented blank image is transformed in a similar manner as that of the augmented image using the selected augmentation parameters.

Once the augmented blank image has been generated, the augmentation-label model 118 is configured to identify, as an augmented boundary label associated with the augmented blank image, the model boundary label in the augmented blank image. More specifically, the image processing module 112 is configured to locate and identify position of the augmented boundary label in the augmented blank image using a contour detection software program. In one example, the contour detection software program is a cv2.findCountours function. While a specific example is provided, the augmentation-label model 118 may employ any program to detect and identify contours, edges, noise or the like associated with the augmented boundary label. Accordingly, the augmentation-label model 118 determines positional data associated with augmented boundary label to locate the augmented boundary label within the augmented blank image. For example, if the augmented boundary label is provided as rectangular box, the positional data includes x and y coordinates of four vertices of the augmented boundary label.

After locating the augmented label on the augmented blank image, the image processing module 112 is configured to mirror and place the augmented label onto the augmented image. In one form, the positional data of the augmented boundary label is saved to a file, such as a JSON file, as part of the augmented image data.

To define a locked boundary label, the augmentation-label model 118 is configured define a locked boundary label based on the positional data of the model boundary label. Specifically, dimensions of the locked boundary label are defined to be unrestricted to dimensions of the boundary label of the authentic image. Accordingly, the augmentation-label model 118 determines minimum and maximum values of model boundary label for each of the x-axis and the y-axis. The locked boundary label is defined to have four vertices using the following coordinates: vertex 1 (a minimum x-value, a minimum y-value); vertex 2 (maximum x-value, minimum y-value), vertex 3 (maximum x-value, maximum y-value), and vertex 4 (a minimum x-value, a maximum y-value).

Figure 3:
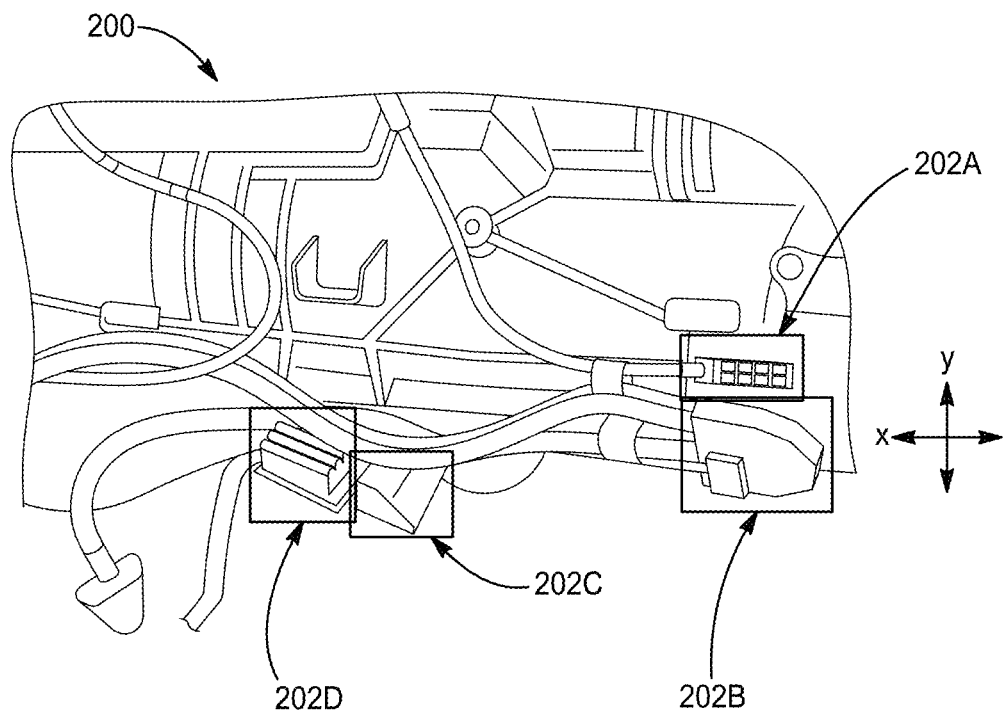
FIG. 3 is an example of an authentic image having multiple labels according to the present disclosure.
Figure 4:
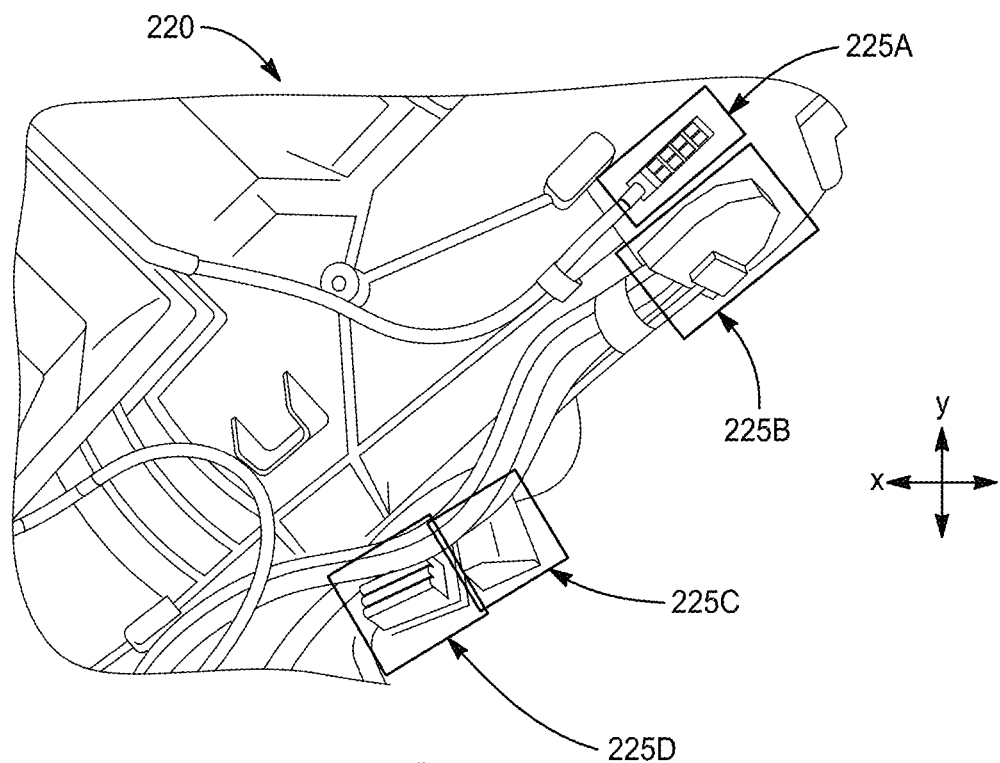
FIG. 4 is an example of an augmented image with a model boundary label generated using the IDG system of FIG. 2, according to the present disclosure.
Figure 5:
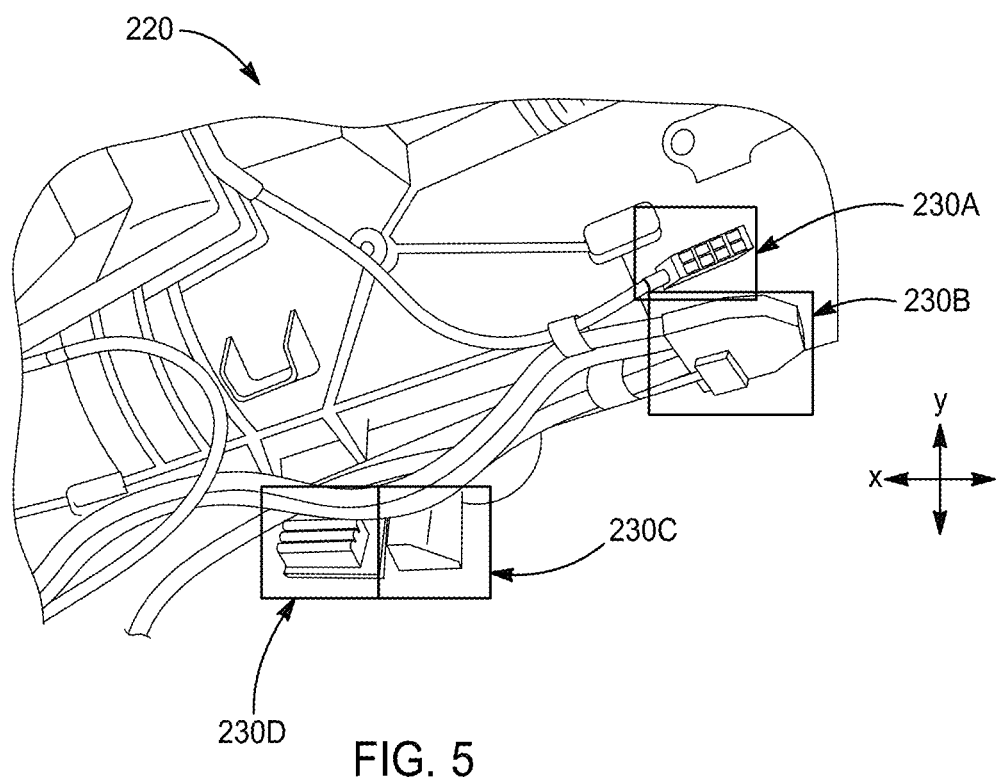
FIG. 5 is an example of an augmented image with a locked boundary label generated using the IDS system of FIG. 2, according to the present disclosure.

Referring to FIGS. 3, 4, and 5, an example authentic image 200 illustrates a portion of a chassis having four boundary labels 202A-202D. An x-y coordinate axis is provided in FIGS. 3, 4, and 5 to illustrate a first model axis and a second model axis that define a two-dimensional coordinate plane of the blank image. FIG. 4 illustrates an augmented image 220) having augmented boundary labels 225A-225D that are provided as unlocked boundary labels and are augmented labels of boundary labels 202A-202D, respectively. FIG. 5 illustrates the augmented image 220 having augmented boundary labels 230A-230D that are provided as locked boundary labels having axes (e.g., a first boundary axis and a second boundary axis) parallel to the x-y coordinate system.

The augmented image data includes data indicative of the augmented image and of the augmented boundary label. In one form, the module 112 outputs the augmented boundary label as the model boundary label. In another form, the image processing module 112 outputs the augmented boundary label as the locked boundary label.

In one form, the augmentation label model 118 may be applied automatically when there is a boundary label with the authentic image. In another form, the user may be able to elect to have the augmentation label model 118 performed. For example, the image interface module 110 is configured display graphical interface inquiring whether the user would like to augment the boundary label if provided with the authentic image. In addition, in some forms, the user is also able to select the type of label augmentation as either the model boundary label or the locked boundary label.

If the label augmentation is automatically or is selected by the user, the image processing module 112 may selectively perform the augmentation label model 118 based on the selected augmentation parameters. Specifically, the image processing module 112 is configured to perform the augmentation label model 118 when the selected augmentation parameters include an orientation modification parameter. That is, the position of the boundary label is generally changed by orientation related augmentation parameters, and thus, if the selected augmentation parameters only includes, for example, brightness and color, the image processing module 112 may not generate an augmented boundary label. Accordingly, the image processing module 112 determines if the selected augmentation parameters include an orientation modification parameter and performs a boundary label augmentation in response to the selected augmentation parameters including the orientation modification parameter. Conversely, if the selected augmentation parameters do not include the orientation modification parameter, the boundary label augmentation routine is not performed.

The IDG system 100 of the present disclosure is configured to augment a boundary label when augmenting an authentic image and save data related to the augmented boundary label so that the augmented boundary label can be used by a machine learning model of different configurations. The IDC system simplifies a preprocessing step of the image and reduces the time used to generate boundary labels for augmented images.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   obtaining an authentic image of an assembly and a boundary label provided with the authentic image, wherein the boundary label is associated with a selected region of the authentic image depicting a selected object;
   generating an augmented image based on the authentic image and an augmentation model employing one or more augmentation parameters;
   defining a model boundary label on a blank image at a region that correlates with the selected region of the authentic image;

generating an augmented blank image based on the one or more augmentation parameters employed for the augmented image;

identifying, as an augmented boundary label associated with the augmented image, the model boundary label as the augmented boundary label associated with the augmented image in the augmented blank image;

outputting an augmented image data, wherein the augmented image data incudes data indicative of the augmented image and of the model boundary label as the augmented boundary label; and detecting defects in the assembly or identifying objects in an assembly process by training a machine learning model based on the augmented image data and the augmented boundary label.

2. The method of claim 1 further comprising:
defining a locked boundary label based on positional data of the model boundary label, wherein:
the locked boundary label is outputted as the augmented boundary label, and
dimensions of the locked boundary label is defined to be unrestricted to dimensions of the boundary label of the authentic image.

3. The method of claim 2, wherein:
the locked boundary label is defined by a first boundary axis and a second boundary axis orthogonal to the first boundary axis,
the first boundary axis and the second boundary axis are parallel to a first model axis and a second model axis, respectively, and
the first model axis and the second model axis are orthogonal to each other and define a two-dimensional coordinate plane of the blank image.

4. The method of claim 3, wherein defining the locked boundary label further includes setting coordinates of the locked boundary label based on a maximum coordinate value and a minimum coordinate value of the model boundary label along each of the first model axis and the second model axis.

5. The method of claim 2 further comprising determining whether a locked boundary label is desired, wherein, the defining the locked boundary label is provided in response to determining the locked boundary label is desired.

6. The method of claim 1, wherein the augmented blank image is defined by a plurality of pixels having a black pixel value.

7. The method of claim 1, wherein dimensions of the model boundary label is restricted to dimensions of the boundary label associated with the authentic image.

8. The method of claim 1, wherein an orientation of the model boundary label is unrestricted to an orientation of the boundary label associated with the authentic image.

9. The method of claim 1, wherein the identifying, as the augmented boundary label associated with the augmented image, the model boundary label in the augmented blank image using a contour identification software application.

10. The method of claim 1, wherein the augmentation parameters includes a rotation parameter, a vertical translation parameter, a horizontal translation parameter, or a combination thereof.

11. A method comprising:
obtaining an authentic image of an assembly and a boundary label provided with the authentic image, wherein the boundary label is associated with a selected region of the authentic image depicting a selected object;

generating an augmented image based on the authentic image and an augmentation model employing one or more augmentation parameters;

determining whether the one or more augmentation parameters includes an orientation modification parameter;

outputting, in response to the one or more augmentation parameter including the orientation modification parameter, a first augmented image data, wherein the first augmented image data includes data indicative of the augmented image and of the boundary label; and performing a boundary label augmentation routine, in response to the one or more augmentation parameter including the orientation modification parameter, wherein the boundary label augmentation routine comprises:
defining a model boundary label on a blank image at a region that correlates with the selected region of the authentic image;
generating an augmented blank image based on the one or more augmentation parameters employed for the augmented image;
identifying, as an augmented boundary label associated with the augmented image, the model boundary label as the augmented boundary label associated with the augmented image in the augmented blank image;
outputting a second augmented image data, wherein the second augmented image data includes data indicative of the augmented image and of the model boundary label as the augmented boundary label; and
detecting defects in the assembly or identifying objects in an assembly process by training a machine learning model based on the second augmented image data and the augmented boundary label.

12. The method of claim 11, wherein the augmentation parameters further includes a contrast parameter, a brightness parameter, a sharpness parameter, or a combination thereof.

13. The method of claim 11, wherein the boundary label augmentation routine further comprises:
defining a locked boundary label based on positional data of the model boundary label, wherein:
the locked boundary label is outputted as the augmented boundary label, and
dimensions of the locked boundary label is defined to be unrestricted to dimensions of the boundary label of the authentic image.

14. The method of claim 13, wherein:
the locked boundary label is defined by a first boundary axis and a second boundary orthogonal to the first boundary axis,
the first boundary axis and the second boundary axis are parallel to a first model axis and a second model axis, respectively, and
the first model axis and the second model axis are orthogonal to each other and define a two-dimensional coordinate plane of the blank image.

15. The method of claim 14, wherein defining the locked boundary label further includes setting coordinates of the locked boundary label based on a maximum coordinate value and a minimum coordinate value of the model boundary label along each of the first model axis and the second model axis.

16. The method of claim 13, wherein the boundary label augmentation routine further comprises determining whether a locked boundary label is desired, wherein, the defining the locked boundary label is provided in response to determining the locked boundary label is desired.

17. The method of claim 11, wherein the orientation modification parameter includes a rotation parameter, a vertical translation parameter, a horizontal translation parameter, or a combination thereof.

18. The method of claim 11, wherein dimensions of the model boundary label is restricted to dimensions of the boundary label associated with the authentic image.

19. The method of claim 11, wherein an orientation of the model boundary label is unrestricted to an orientation of the boundary label associated with the authentic image.

20. The method of claim 11, wherein the identifying, as the augmented boundary label associated with the augmented image, the model boundary label in the augmented blank image using a contour identification software application.

\* \* \* \* \*